United States Patent [19]

Kawaguchi

[11] Patent Number: 4,553,769
[45] Date of Patent: Nov. 19, 1985

[54] FRONT FORK FOR A TWO-WHEELED VEHICLE

[75] Inventor: Takeshi Kawaguchi, Saitama, Japan

[73] Assignee: Honda Giken Kogyo Kabushiki Kaisha, Tokyo, Japan

[21] Appl. No.: 624,932

[22] Filed: Jun. 27, 1984

[30] Foreign Application Priority Data

Jun. 28, 1983 [JP] Japan ................. 58-116773

[51] Int. Cl.⁴ ............................................. B62K 25/08
[52] U.S. Cl. .................................... 280/276; 188/271
[58] Field of Search ........................ 280/276; 180/219; 188/271; 267/140.1, 9 R

[56] References Cited

FOREIGN PATENT DOCUMENTS

| 828059 | 12/1951 | Fed. Rep. of Germany | 280/276 |
| Ad.6008 | 8/1906 | France | 280/276 |
| 543398 | 9/1922 | France | 280/276 |
| 631680 | 12/1927 | France | 280/276 |

Primary Examiner—John A. Pekar
Attorney, Agent, or Firm—Lyon & Lyon

[57] ABSTRACT

A strut for a front fork of a two-wheeled vehicle including an inner tube, an outer tube and a cushion spring resisting the telescoping of one tube toward the other. A damping mechanism is illustrated also using damping fluid. Bearings are provided between the inner and outer tubes which include a collar slidably mounted to one of the tubes. A circular bearing is positioned adjacent the collar to retain the collar relative to the other tubes. The collar may move with the tube on which it is mounted through a preselected distance at which time it is constrained by the other tube. A spring biases the collar away from the stop provided on the other tubes such that some relative motion between the tubes can occur prior to the sliding of the collar along the tube upon which it is mounted.

12 Claims, 4 Drawing Figures

FRONT FORK FOR A TWO-WHEELED VEHICLE

BACKGROUND OF THE INVENTION

The field of the present invention is front suspension forks for two-wheeled vehicles and more particularly the telescopic mounting of the struts thereof.

Telescopic front fork systems have been used widely as front suspensions for two-wheeled vehicles such as motorcycles. Such a front suspension is illustrated in FIG. 1 where a first strut 10 and a second strut 12 are arranged in parallel to support a wheel 14 on an axle 16. The struts 10 and 12 each include an inner tube 18 and an outer tube 20. The inner tube 18 and the outer tube 20 are partially telescoped together. The inner tubes 18 of each strut are held rigidly in parallel by an upper bridge 22 and a lower bridge 24. A steering stem 26 is also held in place by the upper and lower bridges 22 and 24 to form a pivot about which the front fork may be pivoted for steering.

A conventional strut for a telescopic front fork is illustrated in detail in FIG. 2. This conventional strut, generally designated 28, includes an outer tube 20 and an inner tube 18 partially telescoped together. A stud pipe 30 is fixed to the outer tube 20 by means of a fastener 32. The stud pipe 30 extends within the inner tube 18 and includes an enlarged head or piston 34 at one end. The upper end of the inner tube 18 is closed by a bolt 36. A suspension spring 38 is enclosed within the inner tube 18, extending between the bolt 36 and the piston 34. Thus, as the outer tube 20 rises relative to the inner tube 18, the suspension spring 38 is compressed between the bolt 36 and the piston 34 to provide a resilient cushioning of the vehicle.

To mount the inner tube 18 within the outer tube 20, two metal bushings 40 and 42 are placed between the tubes 18 and 20. The bushings 40 and 42 are spaced apart to provide additional strength against bending forces. The upper metal bushing 40 is positioned within a groove in the inner surface of the outer tube 20 defined by a shoulder 44 on one side and a seal 46 and spring retainer 48 on the other. The lower bushing 42 is positioned within an annular groove formed in the inner tube 18 as illustrated.

A damping function is accomplished employing a fluid 50 which is allowed to flow through a portion of the stud pipe 30 in a central passageway 52 and through holes 54 to the cavity defined between the stud pipe 30 and the inner tube 18. A valve assembly 56 installed at the lower end of the inner tube 18 dampens the motion of the strut by transforming the compression and extension energy produced into thermal energy.

The foregoing conventional strut for a front fork system requires relative sliding between the inner tube 18 and the outer tube 20 as borne by the metal bushings 40 and 42. Because of the variations in frictional forces between the bushings 40 and 42 and the inner and outer tubes 18 and 20, a consistant and smooth extension or contraction of the strut is not necessarily experienced. This movement may not be sufficiently smooth because of the difference between static friction of the metal bushings 40 and 42 against the tubes 18 and 20. Once sliding friction commences, relativjly smooth motion is experienced.

In order to improve the ride, it would be advantgeous to overcome the static friction to reduce that friction to a level comparahle to the sliding friction of the components. However, such frictional characteristics depend to a large extent on the materials employed, the lubricant employed and the retention of lubricant between the sliding surfaces. Such factors are often difficult to control.

SUMMARY OF THE INVENTION

The present invention pertains to a strut construction for a front fork of a two-wheeled vehicle. A more uniform friction between telescoping tubes is created by a reduction in the effect of static friction between the components. By effectively dealing with static friction, an improved ride is achieved with such a suspension system particularly at the beginning of each stroke.

To accomplish the foregoing, one or more bearing elements is resiliently mounted in the strut between the telescoping tubes. This resilient mounting allows the tubes to build up some relative motion prior to sliding of the bearing. By doing so, the static friction between the components is substantially overcome.

Accordingly, it is an object of the present invention to provide an improved front fork assembly for a two-wheeled vehicle. Other and further objects and advantages will appear hereinafter.

DETAILED DESCRIPTION OF THE PREFERRED EMBODIMENT

Figure 1:
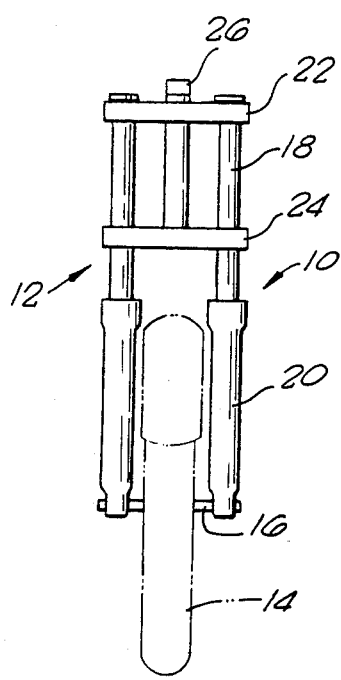
FIG. 1 is a front view of a front fork of a two wheeled vehicle.
Figure 2:
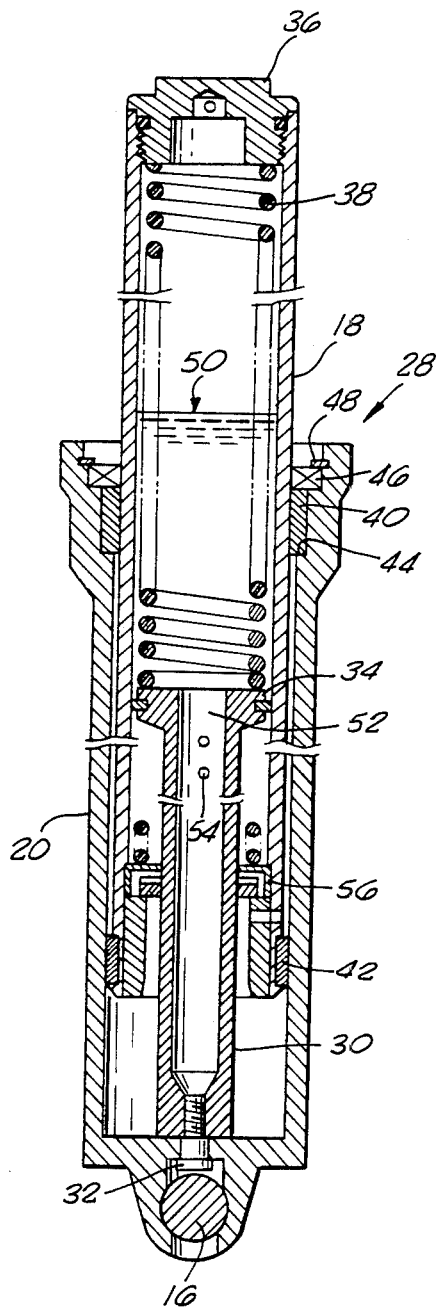
FIG. 2 is a cross-sectional view of a prior art strut for a front fork.

Turning in detail to the drawings, FIG. 1 illustrates a front fork assembly with which the present invention may be employed. The strut illustrated in the embodiment of FIG. 3 includes an overall structure similar to that of the conventional strut illustrated in FIG. 2. Consequently, corresponding reference numbers are employed to denote similar or identical components.

Figure 3:
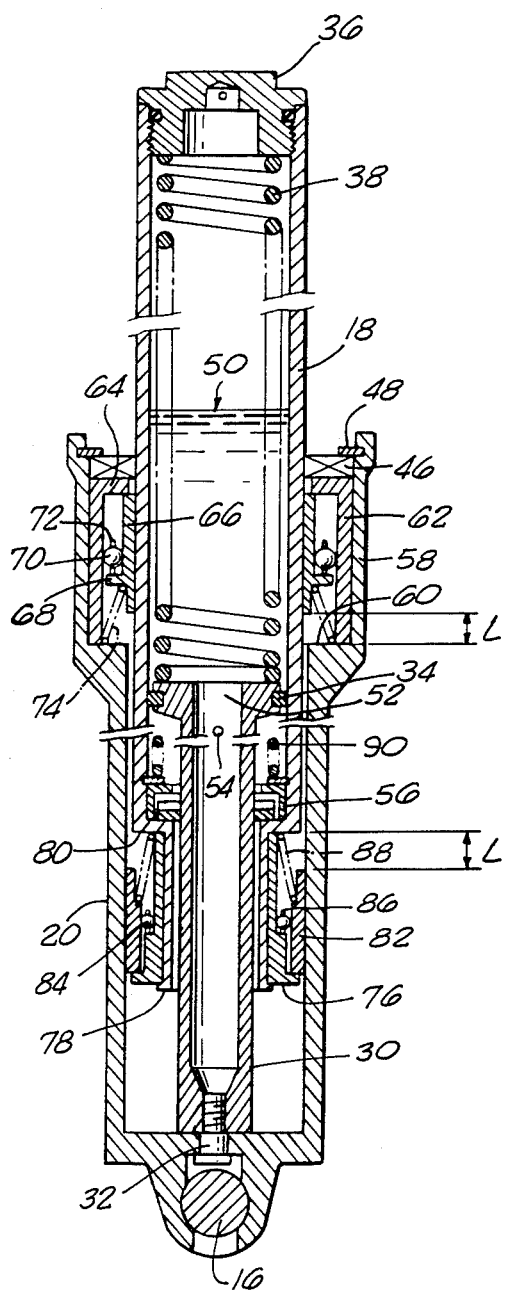
FIG. 3 is a cross-sectional view of a strut of the present invention.

Looking then to the novel mounting arrangements of FIG. 3, an enlarged bearing holder 58 is shown to be located at the upper end of the outer tube 20. The bearing holder 58 may be conveniently cylindrical in cross section and includes a lower shoulder 60 formed within the wall of the outer tube 20. An upper end to the bearing holder 58 is defined by the seal 46 and the spring retainer 48. Positioned within the bearing holder 58 is a cylindrical sleeve 62. The cylindrical sleeve 62 includes a radially inwardly extending flange 64 at its upper end abutting against the seal 46. Thus, a cavity is formed between the shoulder 60 and the radially inwardly extending flange 64 and bounded circumferentially by the sleeve 62.

Positioned within the cavity thus defined is a collar 66. The collar 66 is positioned about the inner tuoe 18 and is able to slide axially on that tube. The collar 66 includes an outwardly extending radial flange 68. The axial length of the collar 66 is sufficient to provide a bearing surface for supporting the inner tube 18 within the outer tube 20 and allow it to telescope into and out of the outer tube 20. The collar 66 not only is able to move axially relative to the inner tube 18, but also is able to move to a limited extent within the sleeve 62.

The relative movement of the collar 66 within the sleeve 62 is bounded by the radial flange 64 and by the shoulder 60.

To maintain the collar 66 and in turn the inner tube 18 centered within the outer tube 20, a ball bearing 70 extends in a ring between the collar 66 and the sleeve 62 of the outer tube 20. The ball bearing 70 includes a circular ball cage 72 to retain a plurality of balls appropriately spaced and positioned. The radial flange 68 on the collar 66 helps locate the ball bearing 70.

Also associated with the collar 66 is a conical spring 74. The conical spring 74 biases the collar 66 to one end of the cavity defined within the bearing holder 58. The bias is in a direction such that movement of the inner tube 18 from its rest position may be accompanied by the collar 66 within the cavity of the bearing holder 58. In the preferred embodiment illustrated in FIGS. 3, this spring 74 retains the collar 66 at the top end of the cavity. With the collar 66 biased upwardly, the chosen lengths of the collar 66 and of the cavity of the bearing holder 58 are such that a clearance L is afforded in the rest position.

In the embodiment of FIG. 3, a lower bearing assembly is illustrated which is substantially the reverse of the bearing assembly contained within the bearing holder 58. A sleeve 76 is arranged about the inner tube 18 in an area of reduced diameter on the inner tube 18. A flange 78 at the lower end thereof retains the sleeve 76 as does a shoulder 80 similar to the operation of the shoulder 60, each forming a stop for a collar. A collar 82 is slidably positioned within the outer tubing 20. This collar 82 is located between the outer tube 20 and a ball bearing 84 consisting of a plurality of balls and a ball cage 86. The ball bearing 84 runs within the sleeve 76 and the collar 82 which form races on either side thereof. A spring 88 biases the collar 82 away from the stop defined by the shoulder 80.

Looking at the operation of the strut of FIG. 3, the strut is illustrated in its relaxed position. In this position, the spring 38 is allowed to extend the inner tube 18 as far as possible from the outer tube 20. As a bump or other compressing action occurs, the outer tube 20 is telescoped upwardly about the inner tube 18. As this relative motion occurs, the static friction between the collar 66 and the outer wall of the inner tube 18 forces the collar 66 to move with the inner tube 18. The restoring force developed by the conical spring 74 is only sufficient to bias the collar 66 to one end of the cavity; and therefore, the response of the struts to small compressive motions is smooth. The static friction between the collar 66 and the inner tube 18 does not affect this motion.

After the tubes have compressed the distance L, the collar 66 encounters the stop or shoulder 60. At this point, the tube 18 begins to slide within the collar 66, the collar 66 providing a bearing surface for retaining the tubes in alignment. Because the initial relative movement between tubes does not require breaking of the static friction at the collar 66 the operation of the strut itself is made smoother. As kinetic energy develops in the tubes, the breaking of the static friction becomes less of a factor on the strut response. Naturally, the lower bearing assembly acts in a similar, if reverse, manner. The collar 82 is eventually sufficiently moved by operation of the strut that it encounters the shoulder 80. At this point, sliding occurs.

Once having compressed to an amount responsive to the initiating bump, the strut rebounds with the motion between the tubes being damped by the fluid 50. At an extreme rebound, a cushion spring 90 protects the components from damaging impact.

Turning then to the embodiment of FIG. 4, once again corresponding reference numerals are employed for identical or substantially equivilent components. In this instance, two substantially identical bearing assemblies are illustrated as being contained within an extended bearng holder 92. To properly locate each of the sleeves 62 and to provide a stop for the upper bearing assembly, a spacer 94 extends axially within the bearing holder 58.

Figure 4:
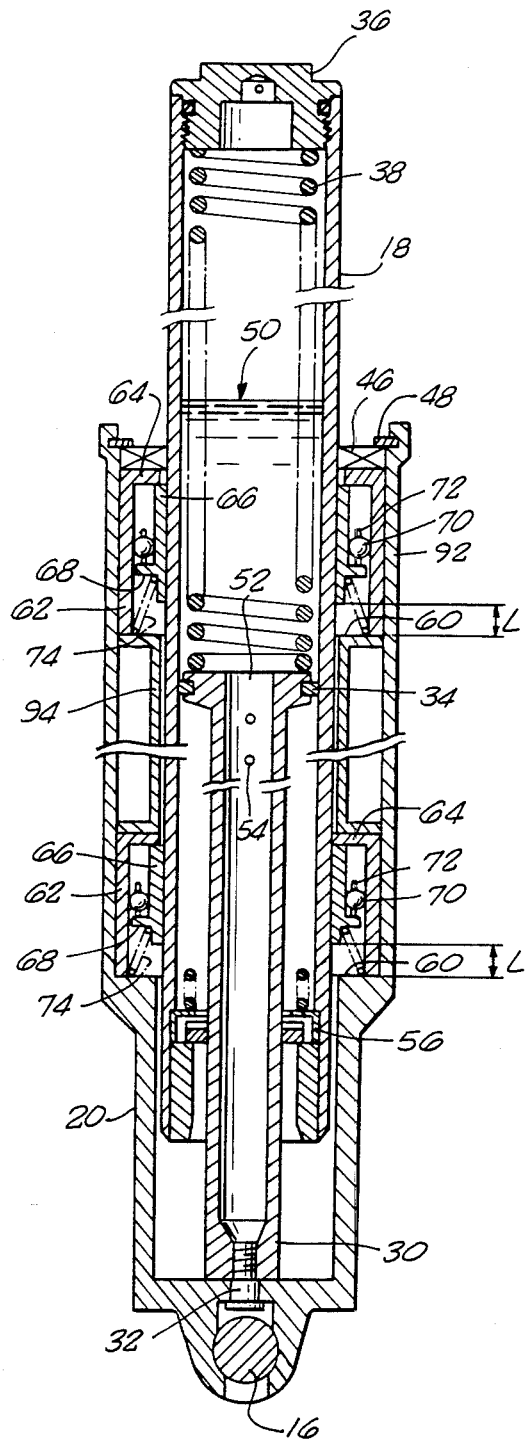
FIG. 4 is a cross-sectional view of a second embodiment of a strut of the present invention.

Thus, the embodiment of FIG. 3 illustrates two bearing assemblies which are substantially the reverse of one another. In FIG. 4, substantially identical bearing assemblies are disclosed for the upper and lower bearings. It is also well within the contemplation of the present invention that only one such bearing assembly would be employed with the conventional metal bushing providing the additional mounting mechanism. With even one assembly of the present invention employed, the static friction is substantially reduced.

Thus, an improved strut for a front fork of a two-wheeled vehicle is illustrated which increases the smoothness of the strut performance. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A strut for a telescopic front fork of a two-wheeled vehicle, comprising
a first tube;
a second tube partially telescoped together with said first tube;
a collar positioned between said first and second tubes and being slidably mounted to said first tube,
a ball bearing between said collar and said second tube;
a stop between said first and second tubes and fixed to said second tubes; and
a spring biasing said collar away from said stop.

2. The strut of claim 1 wherein said first tube is an inner tube and said second tube is an outer tube pariially telescoped together.

3. The strut of claim 1 wherein said second tube includes a shoulder thereon extending toward said first tube, said shoulder defining said stop.

4. The strut of claim 1 wherein said first tube is an outer tube and said second tube is an inner tube partially telescoped together.

5. The strut of claim 1 wherein said first tube is an inner tube and said collar is slidably mounted around said first tube.

6. The strut of claim 1 wherein said first tube is an outer tube and said collar is slidably mounted within said first tube.

7. The strut of claim 1 wherein said ball bearing includes a circular ball cage and a plurality of balls therein, said collar and said second tube being races for said ball bearing.

8. The strut of claim 1 wherein said collar includes a radially extending flange against which said ball bearing abuts.

9. The strut of claim 7 wherein said second tube includes a sleeve against which said ball bearing bears.

10. The strut of claim 1 including a second stop between said first and second tubes and fixed to said second tube, said second stop being displaced from said stop by a fixed distance and opposed to said stop, said collar being included between said stop and said second stop and having an axial length smaller than said fixed distance.

11. A strut for a telescopic front fork of a two-wheeled vehicle, comprising a first tube;

a second tube partially telescoped together with said first tube;

a first collar positioned between said first and second tubes and being slidably mounted to said first tube;

second collar positioned between said first and second tubes and being slidably mounted to said second tube;

a first ball bearing between said first collar and said second tube;

a second ball bearing between said first collar and said first tube;

a first stop between said first and second tubes and fixed to said second tube adjacent said first collar;

a second stop between said first and second tubes and fixed to said first tube adjacent said second collar;

a first spring biasing said first collar away from said first stop; and a second spring biasing said second collar away from said second stop.

12. A strut for a telescopic front fork of a twowheeled vehicle, comprising a first tube;

a second tube partially telescoped together with said first tube;

a first collar and a second collar each positioned between said first and second tubes and being slidably mounted to said first tubes;

a first ball bearing and a second ball bearing, said first ball bearing being positioned between said first collar and said second tube and said second ball bearing being positioned between said second collar and said second tube;

a first stop and a second stop each being between said first and second tubes and fixed to said second tube;

a first spring biasing said first collar away from said first stop; and a second spring biasing said second collar away from said second stop.

* * * * *